United States Patent
Isogawa et al.

(10) Patent No.: US 7,387,821 B2
(45) Date of Patent: Jun. 17, 2008

(54) GOLF BALL AND PROCESS FOR PREPARING THE SAME

(75) Inventors: Kazuhiko Isogawa, Kobe (JP); Takashi Sasaki, Kobe (JP)

(73) Assignee: SRI Sports Limited, Kobe-Shi (JP)

( * ) Notice: Subject to any disclaimer, the term of this patent is extended or adjusted under 35 U.S.C. 154(b) by 270 days.

(21) Appl. No.: 11/245,078

(22) Filed: Oct. 7, 2005

(65) Prior Publication Data

US 2006/0084757 A1 Apr. 20, 2006

(30) Foreign Application Priority Data

Oct. 19, 2004 (JP) ............................. 2004-304783

(51) Int. Cl.
*A63B 37/14* (2006.01)
*A63B 37/00* (2006.01)
*C09D 175/04* (2006.01)

(52) U.S. Cl. .................. 427/393.5; 473/371; 473/378; 428/423.1; 428/423.3; 428/424.2; 524/839; 524/840; 525/457

(58) Field of Classification Search ..................... None
See application file for complete search history.

(56) References Cited

U.S. PATENT DOCUMENTS 5,108,653 A * 4/1992 Taylor ........................ 516/71
6,248,819 B1 * 6/2001 Masuda et al. ............. 524/195
6,255,382 B1 * 7/2001 Hamada et al. ............. 524/591
2004/0022948 A1 * 2/2004 Brown et al. ............... 427/314

FOREIGN PATENT DOCUMENTS

JP 2-11095 Y2 3/1990
JP 8-71177 A 3/1996

* cited by examiner

*Primary Examiner*—David Buttner
(74) *Attorney, Agent, or Firm*—Birch, Stewart, Kolasch & Birch, LLP

(57) ABSTRACT

The object of the present invention is to provide a golf ball having a paint film which is obtained from an environment-friendly aqueous paint and is excellent in the durable adhesion.

The present invention provides a golf ball comprising a golf ball body, and a paint film covering said golf ball body, wherein the paint film has a resin component which is a reaction product obtainable by reacting an aqueous polyurethane having a carboxyl group with an aqueous polycarbodiimide and the blending ratio of the aqueous polycarbodiimide to the aqueous polyurethane having the carboxyl group is ranging from 0.9 to 1.5 at a molar ratio of a carbodiimide group to a carboxyl group(carbodiimide group/carboxyl group).

16 Claims, No Drawings

GOLF BALL AND PROCESS FOR PREPARING THE SAME

BACKGROUND OF THE INVENTION

1. Field of the Invention

The present invention relates to a golf ball and a process for preparing the same, more particularly to the golf ball having a paint film and the process for preparing the same.

2. Description of the Related Art

A conventional golf ball has a paint film on the surface of the golf ball body. The paint film is formed to prevent the deterioration of the golf ball body due to the exposure of the sun light and the weather, as well as impart a gloss to the golf ball body, thereby improving the appearance thereof. It is required for the paint film to have a durable adhesion against the impact, since the golf ball is repeatedly used and hit. Especially, since hitting the golf ball deforms the golf ball body, the paint film is likely to peel off in the case that the paint film covering the golf ball body does not follow the deformation of the golf ball body. In addition, the paint film may peel off when the golf ball is subject to the friction against the golf clubs when hitting the golf ball, and against the ground surfaces such as sand of bunker and rough when landing on the ground.

In recent years, it has been expected to reduce the usage of the solvent-borne paint in view of the environmental problems, and an aqueous paint has been studied to replace the solvent-borne paint used for the golf ball. For example, Japanese patent publication No. H08-71177 A discloses a golf ball where an aqueous polyurethane dispersion having a carboxyl group crosslinked with carbodiimide compound is painted. Japanese utility publication No. H02-11095 B discloses a golf ball where a high molecular weight of an aqueous polyurethane dispersion is coated.

However, carbodiimide compound disclosed in Japanese patent publication No. H08-71177 A is diluted with a solvent, and it is impossible to reduce an amount of the solvent used in the paint, as long as the above carbodiimide compound is used. Japanese utility publication No. H02-11095B discloses ethylene imine as a crosslinking agent for the high molecular weight of the polyurethane, but the usage of ethylene imine is not preferred from the view point of safety and health, since ethylene imine is mutagen. Further, a golf ball having a paint film made from the aqueous paint tends to be inferior to a golf ball having a paint film made from the solvent-borne paint in terms of the durable adhesion.

SUMMARY OF THE INVENTION

The present invention has been achieved in view of the above circumstances. The object of the present invention is to provide a golf ball having a paint film which is obtained from an environment-friendly aqueous paint and is excellent in the durable adhesion. The present invention is characterized in using an aqueous paint which includes an aqueous polyurethane having a carboxyl group and an aqueous polycarbodiimide at the blending ratio of the aqueous polycarbodiimide to the aqueous polyurethane having the carboxyl group ranging from 0.9 to 1.5 at a molar ratio of a carbodiimide group to a carboxyl group (carbodiimide group/carboxyl group).

The present invention provides a golf ball comprising a golf ball body, and a paint film covering said golf ball body, wherein the paint film has a resin component which is a reaction product obtainable by reacting an aqueous polyurethane having a carboxyl group with an aqueous polycarbodiimide and the blending ratio of the aqueous polycarbodiimide to the aqueous polyurethane having the carboxyl group is ranging from 0.9 to 1.5 at a molar ratio of a carbodiimide group to a carboxyl group(carbodiimide group/carboxyl group).

The present invention also provides a process for preparing a golf ball comprising coating an aqueous paint to a golf ball body to form a paint film, wherein the aqueous paint includes an aqueous polyurethane having a carboxyl group, and an aqueous polycarbodiimide, and the blending ratio of the aqueous polycarbodiimide to the aqueous polyurethane having the carboxyl group is ranging from 0.9 to 1.5 at a molar ratio of a carbodiimide group to a carboxyl group (carbodiimide group/carboxyl group).

In the present invention, the usage of the aqueous polycarbodiimide dispersed or dissolved in water enables to reduce the amount of the solvent contained in the aqueous paint used when painting a golf ball. Further, adjusting the blending ratio of the carbodiimide group of the aqueous polycarbodiimide to the carboxyl group of the aqueous polyurethane in a specific range provides a paint film excellent in durable adhesion. In the present invention, "aqueous" means "water soluble" and "water dispersible".

According to the present invention, it is possible to reduce the amount of the organic solvent contained in the aqueous paint used for production of a golf ball. In addition, the paint film of the obtained golf ball is excellent in durable adhesion.

DESCRIPTION OF THE PREFERRED EMBODIMENT

The golf ball of the present invention comprises a golf ball body, and a paint film covering said golf ball body, wherein the paint film has a resin component which is a reaction product obtainable by reacting an aqueous polyurethane having a carboxyl group with an aqueous polycarbodiimide and the blending ratio of the aqueous polycarbodiimide to the aqueous polyurethane having the carboxyl group is ranging from 0.9 to 1.5 at a molar ratio of a carbodiimide group to a carboxyl group(carbodiimide group/carboxyl group).

First, the aqueous polyurethane having the carboxyl group and the aqueous polycarbodiimide will be explained below. The aqueous polycarbodiimide used in the present invention is water soluble or water dispersible and has at least two carbodiimide groups in a molecular thereof. Preferably used is an aqueous polycarbodiimide resin. Example of the aqueous polycarbodiimide resin includes a resin having a hydrophilic segment and a segment comprising a repeating unit having a carbodiimide group, as depicted by the following formula (1).

(1)

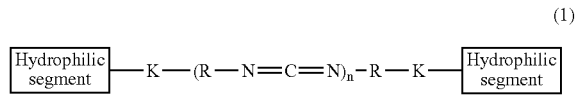

The aqueous polycarbodiimide resin represented by the above chemical formula is obtained by using diisocyanate as a starting material. In formula (1), R is a residue where isocyanate groups are removed from diisocyanate. K means a bond formed by a reaction of isocyanate group and a hydrophilic segment. "n" means an average degree of polymerization and is an integer ranging from 2 to 100. Example of the hydrophilic segment in Formula 1, includes a nonionic segment having an ethylene oxide chain, an anionic hydrophilic segment comprising a sulfonate, sulfate, and the like, or a cationic segment comprising a quaternary ammonium salt. Specific examples of the aqueous polycarbodiimide resin represented by Formula (1) are aqueous tetramethyl xylylene carbodiimide, and aqueous dicyclohexylmethane carbodiimide.

The aqueous polycarbodiimide preferably has a carbodiimide equivalent of 100 or more, more preferably 150 or more, even more preferably 250 or more, and preferably has a carbodiimide equivalent of 500 or less, more preferably 450 or less, even more preferably 400 or less. The aqueous polycarbodiimide having the carbodiimide equivalent of 100 or more enhances the crosslinking density with the aqueous polyurethane having a carboxyl group to provide the higher durability of the resultant paint film. While the aqueous polycarbodiimide having the carbodiimide equivalent of 500 or less enhances the reactivity to shorten the time necessary for the crosslinking reaction with the aqueous polyurethane having the carboxyl group. Herein, "carbodiimide equivalent" means a chemical formula weight (molecular weight) per one molar carbodiimide group of the aqueous polycarbodiimide.

In the present invention, the aqueous polycarbodiimide is preferably used in the form of an aqueous liquid such as an aqueous solution or an aqueous dispersion where the aqueous polycarbodiimide component is dissolved or dispersed into water respectively. The solid content (wt %) of the aqueous liquid is, without limitation, preferably 20 wt % or more, more preferably 30 wt % or more, and preferably 80 wt % or less, more preferably 70 wt % or less. Examples of the aqueous liquid of the aqueous polycarbodiimide resin are "Carbodiimide E-01, E-02, and E-03A (nonionic, solid content 40 wt %)" available from NISSHINBO INDUSTRIES, INC.

The aqueous polyurethane having the carboxyl group used in the present invention is not limited, as long as it is a water soluble or water dispersible polyurethane having the carboxyl group. The aqueous polyurethane is preferably used in the form of an aqueous liquid such as an aqueous solution or an aqueous dispersion where the component of the aqueous polyurethane having the carboxyl group is dissolved or dispersed into water. The aqueous liquid of the aqueous polyurethane having the carboxyl group includes an anionic one which is soluble or dispersible into water by neutralizing the carboxyl group of the aqueous polyurethane having the carboxyl group with a base, a nonionic one which is obtainable by dispersing the aqueous polyurethane having the carboxyl group with high shear into water in the presence of a nonionic surfactant.

The polyisocyanate component constituting the aqueous polyurethane having the carboxyl group includes, for example, an aromatic polyisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODI), xylene diisocyanate (XDI), tetramethylxylylene-diisocyanate(TMXDI) and para-phenylene diisocyanate (PPDI); and an alicyclic or aliphatic polyisocyanate such as 4,4'-dicyclohexylmethane diisocyanate (hydrogenated MDI), hydrogenated xylylenediisocyanate($H_6$XDI) hexamethylene diisocyanate (HDI), and isophorone diisocyanate (IPDI). Among them, non-yellowing type of polyisocyanates (TMXDI, XDI, HDI, $H_6$XDI, IPDI, and H12MDI) are preferable in view of weather resistance. The polyisocyanate can be used either alone or in combination of two or more.

The polyol component constituting the aqueous polyurethane is not limited, as long as it has at least two hydroxyl groups. The polyol includes, for example, a low-molecular weight of polyol having a molecular weight of less than about 500 and a high-molecular weight of polyol having a molecular weight of about 500 or more. Examples of the low-molecular weight of polyol are a diol such as ethylene glycol, diethylene glycol, triethylene glycol, 1,3-butanediol, 1,4-butanediol, neopentyl glycol, 1,6-hexanediol; or a triol such as glycerin, trimethylol propane, and hexanetriol. Examples of the high-molecular weight of polyol are a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. Among them, preferably used is the polyol having a weight average molecular weight of not less than 50, more preferably not less than about 100, and having a weight average molecular weight of not more than 2000, more preferably not more than about 1000. The above polyol can be used individually or in combination of at least two of them.

The aqueous polyurethane having the carboxyl group may further include a polyamine component in addition to the above components. The polyamine component includes, for example, an aliphatic polyamine such as ethylenediamine, propylenediamine, and hexamethylenediamine; an aromatic polyamine such as tolylenediamine, xylylenediamine, and diaminodiphenylmethane; a cycloaliphatic polyamine such as diaminocyclohexylmethane, piperazine, and isophoronediamine; and a dihydrazide or a derivative thereof such as hydrazine, succinic hydrazide, adipic hydrazide, and phthalic dihydrazide. In addition, an alkanolamine such as diethanolamine, monoethanolamine can be used as either of the polyamine component or the low-molecular weight of polyol component.

As a process for incorporating the carboxyl group into the polyurethane, a conventional method can be employed. For example, it is preferable to use a polyol having a carboxyl group as a part of the polyol component. The polyol having the carboxyl group is not limited, as long as it has at least one carboxyl group and at least two hydroxyl groups. Examples of the polyol having the carboxyl group are dimethylol propionic acid, dimethylol butanoic acid, dihydroxypropionic acid, and dihydroxysuccinic acid. It is also preferable to use a polyester polyol having a carboxyl group where trimellitic anhydride and pyromellitic anhydride are used as a polybasic acid component.

As a process for preparing the aqueous liquid of the polyurethane resin having the carboxyl group, a conventional process can be employed. The process includes a process where a urethane prepolymer having a carboxyl group is emulsified into water by neutralizing the carboxyl group thereof with a base and chain-extended, and a process where the urethane prepolymer having a carboxyl group is emulsified with high shear in the presence of a surfactant and chain-extended.

In the following, the process for preparing an aqueous dispersion of the polyurethane resin will be explained based on the embodiment where the urethane prepolymer having the carboxyl group is emulsified into water by neutralizing the carboxyl group thereof with the base. First, the polyisocyanate described above and the polyol described above are used in such a way that an isocyanate group is in excess in a ratio of NCO/OH to form an isocyanate group terminated urethane prepolymer having a carboxyl group with a relatively low-molecular weight. The urethane prepolymer is synthesized at a temperature of 50° C. to 200° C. For the preparation of the urethane prepolymer, a conventional catalyst can be used. Examples of the catalyst are a monoamine such as triethylamine and N,N-dimethylcyclohexyl amine; a polyamine such as N,N,N',N'-tetramethylethylene diamine and N,N,N',N'',N''-pentamethyldiethylene triamine; a cyclic diamine such as 1,8-diazabicyclo[5,4,0]-7-undecene (DBU) and triethylene diamine; and a tin catalyst such as dibutyltin dilaurylate and dibutyltin diacetate. Among these catalysts, it is preferable to use 1,8-diazabicyclo[5,4,0]-7-undecene (DBU) and triethylene diamine.

When preparing the urethane prepolymer, a one-shot method or prepolymer method can be employed. The one-shot method is the method where a reaction between the polyisocyanate and the polyol is conducted at one time, while the prepolymer method is the method where the reaction between the polyisocyanate and the polyol is conducted stepwise. For example, the urethane prepolymer having a low-molecular weight is synthesized once, and then polymerized to higher molecular weight in the prepolymer method. In preparation of the isocyanate group terminated urethane prepolymer having the carboxyl group, it is preferable to use a solvent in view of adjusting a viscosity, and enhancing a dispersibility of the urethane prepolymer.

The solvent preferably includes a solvent which is inactive against the isocyanate group and has a relatively high degree of hidrophilicity. Examples of the solvent are N-methylpyrrolidone, acetone, ethyl acetate, methyl ethyl ketone, N,N-dimethylformamide. The reaction of the urethane prepolymer can be monitored by determining the concentration of the isocyanate group by a dibutylamine titration method. After the reaction of the urethane prepolymer, the obtained isocyanate group terminated urethane prepolymer having the carboxyl group is dispersed into water by neutralizing the carboxyl group with the base. The base includes, for example, a tertiary amine such as ammonium, triethylamine, and triethanolamine; an alkali metal hydroxide such as sodium hydroxide and potassium hydroxide.

The urethane prepolymer is chain-extended with a chain-extender such as a polyamine and the like in water, after the isocyanate group terminated urethane prepolymer having the carboxyl group is emulsified. The chain-extender can be added appropriately, before, concurrently with, after the emulsification, dependent upon the reactivity of the chain-extender used. In the case that the solvent is used to prepare the isocyanate group terminated urethane prepolymer having the carboxyl group, the solvent is preferably recovered after the chain extension.

The aqueous polyurethane having the carboxyl group preferably has an acid number of 10 mgKOH/g or more, more preferably 15 mgKOH/g or more, even more preferably 20 mgKOH/g or more. The aqueous polyurethane having the acid value of 10 mgKOH/g or more provides the reaction site with the aqueous polycarbodiimide and thus the crosslinking density of the resultant paint film is higher. The upper limit of the acid number is not limited, but preferably 60 mgKOH/g, more preferably 50 mgKOH/g, even more preferably 40 mgKOH/g. The aqueous polyurethane having the acid number of 60 mgKOH/g or less enhances the reactivity with the aqueous polycarbodiimide, thereby allowing shortening the time necessary for the crosslinking reaction with the aqueous polycarbodiimide.

In the present invention, the resin component of the paint film is a reaction product obtainable by reacting the aqueous polyurethane having the carboxyl group with the aqueous polycarbodiimide. The blending ratio of the aqueous polycarbodiimide to the aqueous polyurethane having the carboxyl group in the aqueous paint is, without limitation, preferably 0.9 or more, more preferably 1.0 or more, and is preferably 1.5 or less, more preferably 1.3 or less, even more preferably 1.2 or less at the molar ratio of carbodiimide group/carboxyl group.

The blending ratio of 0.9 or more provides the higher crosslinking density of the resultant paint film and thus improves the durable adhesion. On the other hand, if the blending ratio is more than 1.5, the resultant paint film has a lower degree of durable adhesion and tackiness.

The golf ball of the present invention has no limitation on its structure of the golf ball body, and includes a one-piece golf ball, a two-piece golf ball, a multi-piece golf ball comprising at least three layers, and a wound-core golf ball. The present invention can be applied to all types of the golf ball. Among them, preferred is a golf ball body comprising a cover such as the two-piece golf ball, the multi-piece golf ball, and the wound-core golf ball, and a resin component constituting the cover prefearbly comprises a resin having a urethane bond or a carboxyl group. In the case that the resin component constituting the cover has a carboxyl group, the aqueous polycarbodiimide react with both the carboxyl group of the resin constituting the cover and the carboxyl group of the aqueous polyurethane constituting the paint film. Thus, the cover and the paint film are bonded via a chemical bond. As a result, the adhesion of the paint film to the cover is getting higher. On the other hand, in the case that the resin constituting the cover is the resin having the urethane bond, since the hydrogen bond is formed between the urethane bond of the polyurethane having the carboxyl group constituting the paint film and the urethane bond of the resin constituting the cover, the adhesion of the paint film to the cover is getting higher.

As the resin having the carboxyl group, an ionomer resin is preferably used. Examples of the ionomer resin are one prepared by neutralizing at least a part of carboxyl groups in a copolymer composed of ethylene and $\alpha,\beta$-unsaturated carboxylic acid with a metal ion, and one prepared by neutralizing at least a part of carboxyl groups in a terpolymer composed of ethylene, $\alpha,\beta$-unsaturated carboxylic acid and $\alpha,\beta$-unsaturated carboxylic acid ester with a metal ion. Examples of the $\alpha,\beta$-unsaturated carboxylic acid are acrylic acid, methacrylic acid, fumaric acid, maleic acid, and crotonic acid. Acrylic acid and methacrylic acid are preferable. Examples of the $\alpha,\beta$-unsaturated carboxylic acid ester are methyl ester, ethyl ester, propyl ester, n-butyl ester, isobutyl ester and the like of acrylic acid, and methacrylic acid. Especially, the ester of acrylic acid and methacrylic acid are preferable.

The metal ion for neutralizing at least a part of the carboxyl groups includes an alkali metal ion such as sodium, potassium, and lithium; a divalent metal ion such as magnesium, calcium, zinc, barium, and cadmium; a trivalent metal ion such as aluminum, or other metal ions such as tin, and zirconium. Among them, sodium, zinc, and magnesium are preferably used.

Examples of the ionomer resin are, but not limited to, HIMILAN 1555, HIMILAN 1557, HIMILAN 1605, HIMILAN 1652, HIMILAN 1702, HIMILAN 1705, HIMILAN 1706, HIMILAN 1707, HIMILAN 1855, HIMILAN 1856 available from MITSUI-DUPONT POLYCHEMICAL CO.; IOTEK 8000, IOTEK 7010 available from Exxon Co.; SURLYN 8945, SURLYN 9945, SURLYN AD8511, SURLYN AD8512, SURLYN AD8542 available from DUPONT CO. These ionomers may be used individually or as a mixture of two or more of them.

The resin having the urethane bond comprises a polyurethane having a plurality of urethane bonds in the molecule thereof. The polyurethane is, for example, a reaction product obtainable by reacting a polyisocyanate with a polyol, if necessary, by further reacting with a polyamine. The polyurethane includes a thermoplastic polyurethane and a thermosetting polyurethane.

The thermoplastic polyurethane is not limited, as long as it can be molded into the cover by injection-molding or compression molding. Examples of the thermoplastic polyurethane are "ELASTOLLAN XNY 90A", "ELASTOLLAN XNY 97A", and "ELASTOLLAN XNY585" available from BASF POLUURETHANE ELASTOMERS.

In one preferred embodiment of the present invention, the thermosetting polyurethane is used as the resin constituting the cover. The thermosetting polyurethane generates many three dimensional crosslinking points, and thus the cover excellent in durability is obtained. The thermosetting polyurethane includes, for example, a type where the isocyanate group terminated urethane prepolymer is cured with a curing agent such as a polyamine and a polyol and a type where the hydroxyl group or amino group terminated urethane prepolymer is cured with a curing agent such as a polyisocyanate.

The resin component constituting the cover may further include a thermoplastic elastomer, a diene type block copolymer and the like in addition to the above polyurethane or the ionomer resin. Examples of the thermoplastic resin are a polyamide elastomer having a commercial name "PEBAX", for example "PEBAX 2533", available from ARKEMA Inc, a polyester elastomer having a commercial name of "HYTREL", for example "HYTREL 3548", "HYTREL 4047", available from DU PONT-TORAY Co, a polyurethane elastomer having a commercial name "ELASTOLLAN", for example "ELLASTOLLAN ET880" available from BASF POLYURETHANE ELASTOMERS Co.

The cover may further include a pigment such as zinc oxide, titanium oxide, and a blue pigment; a gravity adjusting agent such as barium sulfate and calcium carbonate; a dispersant, an antioxidant, an ultraviolet absorber, a light stabilizer, a fluorescent material, and a fluorescent brightener in addition to the above resin component, unless they impart any undesirable property to the cover.

In the following, a core of the wound-core golf ball, the two-piece golf ball, and the multi-piece golf ball or one-piece golf ball body will be explained. The conventional rubber composition can be used for the core and the one-piece golf ball body. For example, the core or the one-piece golf ball body can be molded by heat-pressing the rubber composition comprising a diene rubber as a base rubber, a co-crosslinking agent, and a crosslinking initiator.

Examples of the diene rubber are butadiene rubber (BR), ethylene-propylene-diene terpolymer (EPDM), isoprene rubber (IR), styrene-butadiene rubber (SBR) and acrylonitrile-butadiene rubber (NBR). Among them, butadiene rubber, particularly cis-1,4-polybutadiene, is preferable in view of its superior repulsion property. Typically preferred is the high cis-polybutadiene rubber having cis-1,4 bond in a proportion of not less than 40%, more preferably not less than 70%, even more preferably not less than 90%.

The co-crosslinking agent used in the present invention includes, for example, an α,β-unsaturated carboxylic acid or a metal salt thereof. Typically preferred is the α,β-unsaturated carboxylic acid having 3 to 8 carbon atoms such as acrylic acid and methacrylic acid or the metal salt thereof. As the metal forming the metal salt of the α,β-unsaturated carboxylic acid, a monovalent or divalent metal such as zinc, magnesium, calcium, aluminum and sodium is preferably used. Among them, zinc is preferable, because it can impart the higher repulsion property to the golf ball. The amount of the co-crosslinking agent to be blended in the rubber composition is preferably not less than 20 parts by mass, more preferably not less than 25 parts by mass, and preferably not more than 50 parts by mass, more preferably not more than 40 parts by mass based on 100 parts by mass of the base rubber.

As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. The amount of the organic peroxide to be blended in the rubber composition is preferably not less than 0.2 part by mass, more preferably not less than 0.3 part by mass, and preferably not more than 1.5 parts by mass, more preferably not more than 1.0 part by mass based on 100 parts by mass of the base rubber.

The rubber composition for the core and the one-piece golf ball body may further include a diphenyl disulfide or a derivative thereof. The amount of the diphenyl disulfide or the derivative thereof to be blended is preferably 0.1 parts or more, more preferably 0.3 parts or more, and is preferably 5.0 parts or less, more preferably 3.0 pats or less with respect to 100 parts by mass of the base rubber.

The rubber composition for the core and the one-piece golf ball body may further contain a specific gravity adjusting agent such as zinc oxide and barium sulfate, an antioxidant, a color powder, and the like, as required in addition to the base rubber, the co-crosslinking agent, the crosslinking initiator, and diphenyl disulfide or the derivative thereof. The conditions for press-molding the rubber composition should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

When preparing a multi-piece golf ball comprising at least three layers, an intermediate layer is formed between the core and the cover. The intermediate layer includes, for example, a thermoplastic resin such as a polyurethane resin, an ionomer resin, Nylon, and a polyethylene; a thermoplastic elastomer such as a polystyrene elastomer, a polyolefin elastomer, a polyurethane elastomer, a polyester elastomer, and a polyamide elastomer.

Examples of the ionomer resin are one prepared by neutralizing at least a part of carboxyl groups in a copolymer composed of ethylene and α,β-unsaturated carboxylic acid with a metal ion, and one prepared by neutralizing at least a part of carboxyl groups in a terpolymer composed of ethylene, α,β-unsaturated carboxylic acid and α,β-unsaturated carboxylic acid ester with a metal ion. The intermediate layer may further include a gravity adjusting agent such as barium sulfate and tungsten, an antioxidant, a pigment and the like.

A process for preparing a golf ball of the present invention, comprises coating an aqueous paint to a golf ball body to form a paint film, wherein the aqueous paint includes the aqueous polyurethane having the carboxyl group described above, and the aqueous polycarbodiimide described above, and the blending ratio of the aqueous polycarbodiimide to the aqueous polyurethane having the carboxyl group is ranging from 0.9 to 1.5 at a molar ratio of the carbodiimide group to the carboxyl group(carbodiimide group/carboxyl group). In the process of the present invention, as the aqueous polycarbodiimide, a polycarbodiimide which is dissolved or dispersed in water without containing the solvent substantially is used, thus it is possible to reduce the total amount of the solvent contained in the aqueous paint used. According to the present invention, it is possible to reduce the total amount of the solvent contained in the aqueous paint used to 8 mass % or less, more preferably 3 mass % or less, even more preferably 1 mass % or less.

As the process for coating the paint, the conventional method can be employed. For example, the base resin comprising the aqueous liquid of the polyurethane having the carboxyl group is mixed with the curing agent comprising the aqueous polycarbodiimide to form the aqueous paint, and then the aqueous paint can be applied to the golf ball by the electrostatic coating method, or spray method using an air spray gun. Further, the surface of the golf ball may be subjected to the surface treatment such as cleaning or sandblast prior to the coating.

Subsequently, the aqueous paint coated on the surface of the golf ball body is dried and cured, for example, at the temperature of 30° C. to 60° C. for 1 to 6 hours to obtain the paint film.

The thickness of the paint film after dried, without limitation, is preferably 5 μm or more, more preferably 7 μm or more, and is preferably 25 μm or less, more preferably 18 μm or less. If the thickness is less than 5 μm, the paint film will be easily worn out by the continuous use. While if the thickness is more than 25 μm, the dimple will not work efficiently, thus the flying performance of the resultant golf ball tends to be low. In addition, the paint film may have a single layer structure or a multi layer structure having at least two layers, as long as the thickness of the paint film falls within the above range. The paint film preferably has the single layer structure, because the painting process can be simplified and the paint film in the present invention shows the excellent paint properties even if the paint film has the single layer structure. The paint film can be the outermost clear paint layer, or can be the enamel paint layer containing the pigment. In the case that the paint film is the enamel paint layer, the clear paint layer can be further formed thereon.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation Method]

(1) Durable-adhesion of the Paint Film

Each painted golf ball was hit 100 times repeatedly with a driver (#1) attached to a swing robot manufactured by TRUETEMPER CO, at the head speed of 45 m/sec. The durable-adhesion was evaluated by observing the peeling of the paint film based on the following criteria.
E(Excellent): None of the paint film peeled off.
G(Good): The area where the paint film peeled off was not more than 5% with respect to the whole area of the paint film.
F(Fair): The area where the paint film peeled off was from 5% (exclusive) to 20% with respect to the whole area of the paint film.
P (Poor): The area where the paint film peeled off was more than 20% with respect to the whole area of the paint film.

[Production of a Golf Ball]

(1) Preparation of Solid Core

The rubber composition shown in Table 1 was kneaded and pressed with upper and lower molds each having a spherical cavity at the heating condition of 170° C. for 15 minutes to obtain the core in a spherical shape having a diameter of 41.2 mm.

TABLE 1

| Core formulation | Parts |
|---|---|
| Polybutadiene rubber | 100 |
| Zinc acrylate | 33 |
| Zinc oxide | 12 |
| Diphenyl disulfide | 0.5 |
| Dicumyl peroxide | 1 |

Note on Table 1:
Polybutadiene rubber: BR-18 (cis content: 96%) available from JSR.
Zinc acrylate: Sanceler SR available from Sanshin chemical Industry
Zinc oxide: "Ginrei R" produced by Toho-Zinc.
Diphenyl disulfide: "Diphenyl disulfide" available from Sumitomo Seika Chemicals, Co.
Dicumyl peroxide: "Percumyl D" produced by NOF Corporation.

(2) Preparation of the Cover Composition

The materials shown in Table 2 were mixed using a twin-screw kneading extruder to obtain the cover composition in the form of pellet. The extrusion was conducted in the following conditions:

screw diameter=45 mm, screw revolutions=200 rpm, screw L/D=35, and the cover composition was heated to from 200° C. to 260° C. at the die position of the extruder.

TABLE 2

| Cover material | Cover Composition A | Cover Composition B |
|---|---|---|
| HIMILAN 1605 | 50 | — |
| HIMILAN 1706 | 50 | — |
| Elastollan XNY97A | — | 100 |
| Titanium oxide | 4 | 4 |

Notes on Table 2:
HIMILAN 1605: an ionomer resin of a sodium ion-neutralized ethylene-methacrylic acid copolymer, available from MITSUI-DUPONT POLYCHEMICAL.
HIMILAN 1706: an ionomer resin of a zinc ion-neutralized ethylene-methacrylic acid copolymer, available from MITSUI-DUPONT POLYCHEMICAL.
Elastollan XNY97A: a $H_{12}$MDI-PTMG type thermoplastic polyurethane elastomer available from BASF Japan.

(3) Preparation of the Golf Ball Body

The cover composition thus prepared was directly injection-molded onto the core to form the cover, thereby obtaining the two-piece golf ball body. The upper and lower molds for forming the cover have a spherical cavity with dimples. The part of the dimples can serve as a hold pin which is retractable. When forming the golf ball body, the hold pins were protruded to hold the core, and the resin heated at 210° C. was charged into the mold held under the pressure of 80 tons for 0.3 seconds. After the cooling for 30 seconds, the molds were opened and then the golf ball body was discharged. The obtained golf ball body was deburred to obtain the golf ball body having a diameter of 42.8 mm, cover thickness of 0.8 mm, and a weight of 45.4 g. The clear paint shown in Table 3 was coated on the golf ball body to form a golf ball having a paint film formed on the surface of the golf ball body. The obtained golf balls were evaluated in terms of the durable adhesion of the paint film. The results were also shown in Table 3.

TABLE 3

| | Golf ball No. | | | | | | | | | | | |
|---|---|---|---|---|---|---|---|---|---|---|---|---|
| | No. 1 | No. 2 | No. 3 | No. 4 | No. 5 | No. 6 | No. 7 | No. 8 | No. 9 | No. 10 | No. 11 | No. 12 |
| Cover material | A | A | A | A | A | A | A | B | B | B | B | B |
| Aqueous paint | | | | | | | | | | | | |
| W-615 | 100 | 100 | 100 | 100 | 100 | — | — | 100 | 100 | 100 | 100 | 100 |
| W-6010 | — | — | — | — | — | 100 | — | — | — | — | — | — |
| WS-6021 | — | — | — | — | — | — | 100 | — | — | — | — | — |
| Aqueous polycarbodiimide | 14.6 | 13.2 | 10.2 | 21.9 | 24.9 | 14.3 | 6.9 | 14.6 | 13.2 | 10.2 | 21.9 | 24.9 |
| Molar ratio (Carbodiimide group/ Carboxyl group) | 1.0 | 0.9 | 0.7 | 1.5 | 1.7 | 1.0 | 1.0 | 1.0 | 0.9 | 0.7 | 1.5 | 1.7 |
| Evaluation | — | — | — | — | — | — | — | — | — | — | — | — |
| Amount of an organic solvent contained in the aqueous paint (%) | 0.9 | 0.9 | 0.9 | 0.8 | 0.8 | 0.9 | 0.9 | 0.9 | 0.9 | 0.9 | 0.8 | 0.8 |
| Drying time of paint (hr.) | 1.0 | 1.0 | 1.0 | 1.5 | 3.0 | 1.0 | 1.0 | 1.0 | 1.0 | 1.0 | 1.5 | 2.5 |
| Durable adhesion of the paint film | E | E | P | E | F | E | G | E | E | F | E | F |

Formulation: parts (wet base)
Notes on table 3
W-615: Aqueous polyurethane dispersion available from Mitsui Takeda Chemicals, Inc. (Aqueous liquid of the polyurethane having the carboxyl group, acid number 9 mgKOH/g(wet), solid content 35 mass %)
W-6010: Aqueous polyurethane dispersion available from Mitsui Takeda Chemicals, Inc. (Aqueous liquid of the polyurethane having the carboxyl group, acid number 8.7 mgKOH/g(wet), solid content 30 mass %)
W-6021: Aqueous polyurethane dispersion available from Mitsui Takeda Chemicals, Inc. (Aqueous liquid of the polyurethane having the carboxyl group, acid number 4.2 mgKOH/g(wet), solid content 35 mass %)
Aqueous polycarbodiimide: an aqueous dispersion of the polycarbodiimide having a carbodiimide equivalent of 365 and solid content of 40 mass %, available from NISSHINBO INDUTRIES INC.

Golf balls No.b1, No.2, No.4, No.6, No.7, No.8, No.9 and No.11 are the cases that the paint film was formed by coating the aqueous paint to the golf ball body, wherein the aqueous paint comprises the aqueous polyurethane having the carboxyl group and the aqueous polycarbodiimide at the molar ratio (carbodiimide group/carboxyl group) of the carbodiimide group of the aqueous polycarbodiimide to the carboxyl group of the aqueous polyurethane having a carboxyl group ranging from 0.9 to 1.5. As apparent from the results of Table 3, golf balls No.1, No.2, No.4, No.6, No.8, No.9 and No.11 are excellent in durable adhesion.

The present invention provides a golf ball having a paint film which is obtained from the environment-friendly aqueous paint and is excellent in the durable adhesion, and a process thereof.

This application is based on Japanese Patent application No.2,004-304,783 filed on Oct. 19, 2004, the contents of which are hereby incorporated by reference.

What is claimed is:

1. A golf ball comprising
a golf ball body, and
a paint film covering said golf ball body,
wherein the paint film has a resin component which is a reaction product obtainable by reacting an aqueous polyurethane having a carboxyl group with an aqueous polycarbodiimide having a hydrophilic segment;
the aqueous polycarbodiimide is an aqueous polycarbodiimide resin represented by the following chemical formula; and
a blending ratio of the aqueous polycarbodiimide to the aqueous polyurethane having the carboxyl group ranges from 0.9 to 1.5 at a molar ratio of carbodiimide group to carboxyl group, or carbodiimide group/carboxyl group, (1)

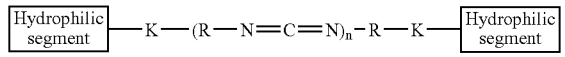

wherein R is a residue formed by removal of isocyanate groups from a diisocyanate, K represents a bond formed by a reaction of an isocyanate group and the hydrophilic segment, and "n" represents an average degree of polymerization and is an integer ranging from 2 to 100.

2. The golf ball according to claim 1, wherein the golf ball body comprises a cover, and a resin component constituting the cover comprises a resin having a urethane bond or a carboxyl group.

3. The golf ball according to claim 2, wherein the resin having a carboxyl group is an ionomer resin.

4. The golf ball according to claim 2, wherein the resin having the urethane bond is polyurethane.

5. The golf ball according to claim 1, wherein the aqueous polycarbodiimide has a carbodiimide equivalent from 100 to 500.

6. The golf ball according to claim 1, wherein the aqueous polyurethane having the carboxyl group has an acid number from 10 mgKOH/g to 60 mgKOH/g.

7. The golf ball according to claim 1, wherein the blending ratio of the aqueous polycarbodiimide to the aqueous polyurethane having the carboxyl group is ranging from 1.0 to 1.2.

8. The golf ball according to claim 1, wherein the aqueous polycarbodiimide resin is an aqueous poly tetramethyl xylene carbodiimide or an aqueous poly dicyclohexylmethane carbodiimide.

9. A golf ball comprising
a golf ball body, and
a paint film covering said golf ball body, wherein the paint film has a resin component which is a reaction product obtainable by reacting an aqueous polyurethane having a carboxyl group with an aqueous polycarbodiimide resin having a hydrophilic segment represented by the following formula (1);
a blending ratio of the aqueous polycarbodiimide resin to the aqueous polyurethane having the carboxyl group ranges from 0.9 to 1.5 at a molar ratio of a carbodiimide group to a carboxyl group, or carbodiimide group/carboxyl group;

the aqueous polycarbodiimide resin has a carbodiimide equivalent from 100 to 500, and the aqueous polyurethane having the carboxyl group has an acid number from 10 mgKOH/g to 60 mgKOH/g, (1)

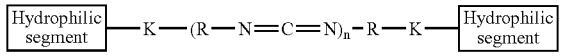

wherein R is a residue formed by removal of isocyanate groups from a diisocyanate, K represents a bond formed by a reaction of an isocyanate group and the hydrophilic segment, and "n" represents an average degree of polymerization and is an integer ranging from 2 to 100.

10. The golf ball according to claim 9, wherein the golf ball body comprises a cover, and the cover comprises polyurethane as a resin having a urethane bond.

11. The golf ball according to claim 9, wherein the golf ball body comprises a cover, and the cover comprises an ionomer resin as a resin having a carboxyl group.

12. A process for preparing a golf ball comprising coating an aqueous paint to a golf ball body to form a paint film, wherein the aqueous paint includes an aqueous polyurethane having a carboxyl group, and an aqueous polycarbodiimide having hydrophilic segment represented by the following formula (1), and a blending ratio of the aqueous polycarbodiimide to the aqueous polyurethane having the carboxyl group ranges from 0.9 to 1.5 at a molar ratio of a carbodiimide group to a carboxyl group, or carbodiimide group/carboxyl group, (1)

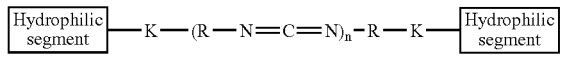

wherein R is a residue formed by removal of isocyanate groups from a diisocyanate, K represents a bond formed by a reaction of an isocyanate group and the hydrophilic segment, and "n" represents an average degree of polymerization and is an integer ranging from 2 to 100.

13. The process according to claim 12, wherein the aqueous paint includes the aqueous polyurethane having the carboxyl group and the aqueous polycarbodiimide in a form of an aqueous liquid.

14. The process according to claim 12, wherein the aqueous paint includes a solvent in an amount of 8 mass % or less.

15. The process according to claim 12, wherein the aqueous paint includes a solvent in an amount of 1 mass % or less.

16. The process according to claim 12, wherein the blending ratio of the aqueous polycarbodiimide to the aqueous polyurethane having the carboxyl group is ranging from 1.0 to 1.2.

* * * * *